A. M. PARKS.
NUT LOCK.
APPLICATION FILED APR. 30, 1915.
1,173,021. Patented Feb. 22, 1916.
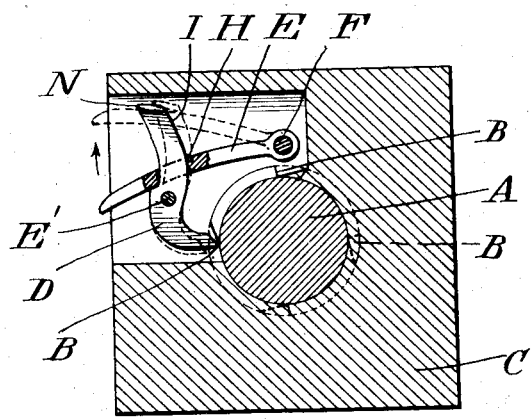
Witnesses
Fenton N Belt
J. H. Sherwood
Inventor
A. M. Parks
By Frank H. N. Hough
Attorney

UNITED STATES PATENT OFFICE.

ALFRED MILTON PARKS, OF MAPLETON DEPOT, PENNSYLVANIA.

NUT-LOCK.

1,173,021.  Specification of Letters Patent.  Patented Feb. 22, 1916.

Application filed April 30, 1915. Serial No. 25,038.

*To all whom it may concern:*

Be it known that I, ALFRED M. PARKS, a citizen of the United States, residing at Mapleton Depot, in the county of Huntingdon and State of Pennsylvania, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in nut locks and comprises a simple and efficient device of this nature, having various details of construction, combinations and arrangements of parts which will be hereinafter fully described, shown in the accompanying drawings and then specifically defined in the appended claim.

My invention is illustrated in the accompanying drawing, in which I have shown a sectional view through a nut and bolt, parts being shown in elevation.

Reference now being had to the details of the drawings by letter, A designates a bolt having longitudinal grooves B formed transversely through the thread.

C is a nut or bur, interiorly threaded for engagement with the threads of the bolt, and D is a pawl which is pivotally mounted upon a pin E in a recess formed in the nut, said pawl having a bent end for engagement with one of the longitudinal grooves B formed in the bolt. A pivotal member, designated by letter E', is mounted upon the pin F within the recess and has an elongated slot H through which the pawl passes, the shank portion of the pawl having a convexed edge I, as shown, and its outer end is bent at an angle as at N to limit the swinging movement of the slotted member in one direction.

In operation, it will be noted that, when the slotted member is moved in one direction or the other, the inner edge of the slot coming against the convexed edge of the shank portion of the pawl will cause the same to tilt upon its pivot, throwing the point thereof into or out of engagement with the groove formed transversely in the threads.

In operation, when the lever E is moved in the direction of the arrow and comes in contact with the outer concaved edge of the pawl D, the latter will be caused to tilt upon its pivot and be thrown out of the notch of the bolt and, when the lever E is moved in the opposite direction, the inner edge of the slot in the lever coming against the convexed edge of the pawl D, the latter will be thrown into the notch of the bolt.

What I claim to be new is:—

A nut lock comprising, in combination with a bolt with threads and having transverse grooves therein and a chamber nut fitted to the bolt, a pawl pivoted within the chamber of the nut and adapted to engage the grooves and provided with a curved shank portion terminating at its outer end at an angle, slightly inclined to the length of the pawl, a lever pivoted within said chamber and having a slot therein for the reception of the curved portion of the pawl, the ends of the slot adapted to actuate the pawl as the lever is swung upon its pivot, the end of the lever projecting outside the chamber of the nut, said angled end of the pawl limiting the movement of the lever in one direction.

In testimony whereof I hereunto affix my signature in presence of two witnesses.

ALFRED MILTON PARKS.

Witnesses:
G. B. SHORE,
M. S. BOWMAN.

Copies of this patent may be obtained for five cents each, by addressing the "Commissioner of Patents, Washington, D. C."